United States Patent [19]
Meisterring

[11] 3,911,544
[45] Oct. 14, 1975

[54] PROFILE-MACHINING TOOL

[75] Inventor: Reinhold Meisterring, Grunbach, Germany

[73] Assignee: Gebr. Saacke K.G., Eutingen bei Pforzheim, Germany

[22] Filed: July 16, 1974

[21] Appl. No.: 488,931

[30] Foreign Application Priority Data
July 27, 1973 Germany............................ 2338146

[52] U.S. Cl................. 29/102 R; 29/104; 29/105 R
[51] Int. Cl.²............................................. B26D 1/12
[58] Field of Search... 29/105 R, 105 A, 104, 102 R

[56] References Cited
UNITED STATES PATENTS

| | | | |
|---|---|---|---|
| 589,905 | 9/1897 | Mattison........................... | 29/102 R |
| 1,229,837 | 6/1917 | Waugh............................... | 29/105 R |
| 2,290,591 | 7/1942 | Hopkins............................. | 29/105 R |
| 3,107,413 | 10/1963 | Ohlinger............................ | 29/105 |
| 3,122,818 | 3/1964 | Nance................................ | 29/105 A |

Primary Examiner—Leonidas Vlachos

[57] ABSTRACT

The tool serves to machine a profile on a workpiece while the same is held stationary. Part-circular cutting teeth are readjustably mounted on a rotary disc in different positions along the axis of said disc and at such a radial distance from said axis that said teeth are adapted to machine said profile.

4 Claims, 3 Drawing Figures

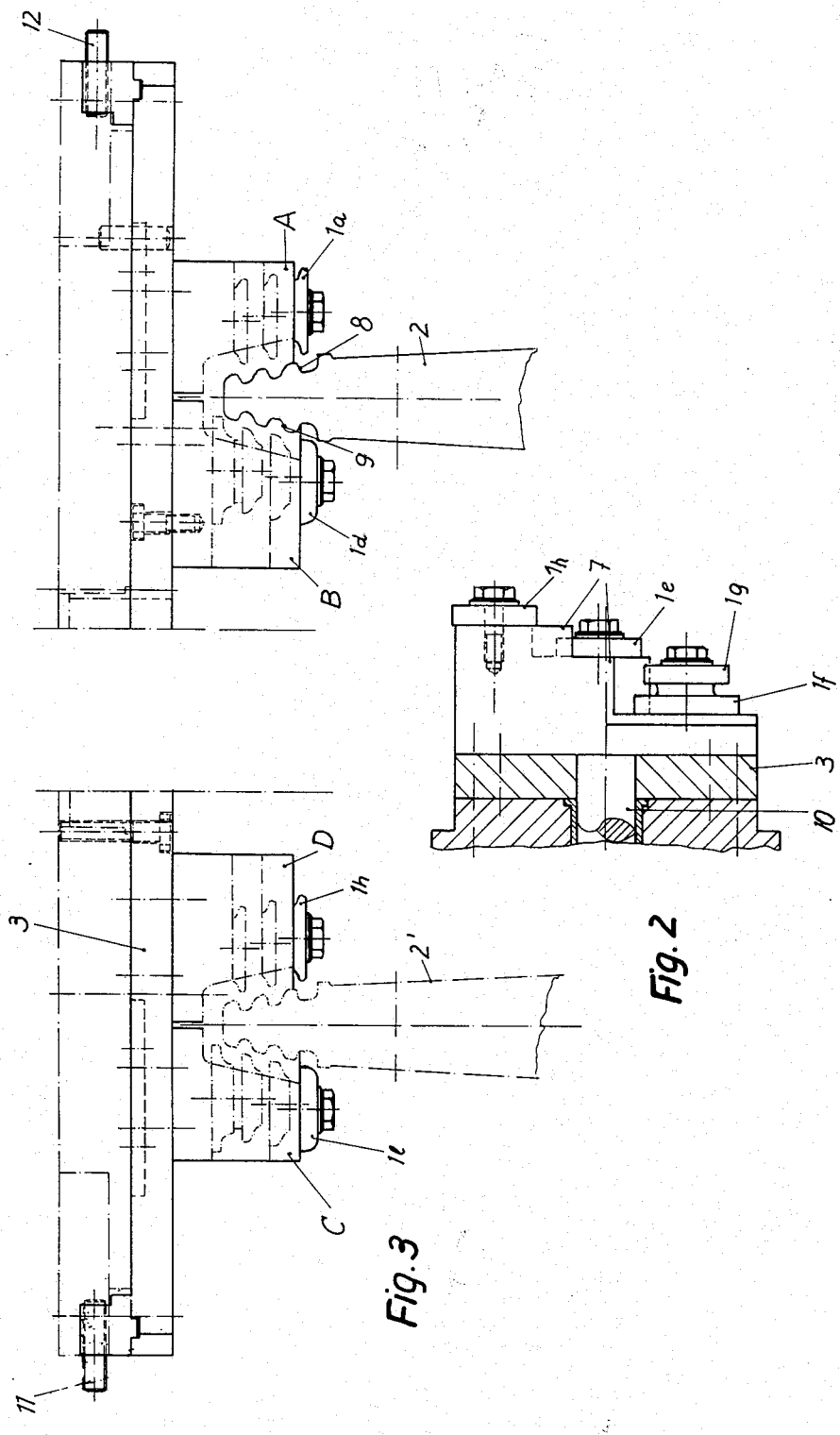

PROFILE-MACHINING TOOL

This invention relates to a cutting tool for machining profiled roots of turbine blades or similar workpieces, such as rotors for turbines.

The profiled roots of turbine blades have previously been machined by means of one-piece milling cutters. Particularly in view of the increasing size of the turbine blades and of their profiled roots, and in view of the precision required for the profiled roots, which carry the blade, such one-piece milling cutters have a relatively short edge life so that an interruption of work to fix new or reground tools is required even during a shift. This practice is time- consuming and laborious, and the repeated regrinding of tools adversely affects the accuracy of the work.

It is an object of the invention to provide a cutting tool, which has a high accuracy and a long edge life, and which can easily be reground. The cutting tool according to the invention for machining profiled roots of turbine blades or similar workpieces is characterized in that a rotary disc carries readjustable part-circular cutting teeth, which serve to cut the outside and/or inside profiles of the workpiece when the same is held stationary said part-circular cutting teeth are arranged in different positions along the axis of the disc and each part-circular cutting tooth is spaced a suitable distance from the axis of the disc. On each of opposite sides of the axis of the disc, the part-circular cutting teeth are arranged along an inner arc of a circle and along an outer arc of a circle. On each side of the axis of the disc, the part-circular cutting teeth disposed on the inner arc of a circle are adjusted to face those on the adjacent outer arc of a circle, and vice versa cutting teeth are provided on one side for machining the carrying portions of the outside profile and on the opposite side for machining the noncarrying portions of the outside profile and the carrying portions of the inside profile thereof. Also in accordance with the invention the part-circular teeth for machining the outside and inside profile portions are arranged on their arcs of a circle in succession in axial positions, which correspond to the profile portions to be machined by the respective teeth.

Compared to the known milling tools used for these purposes, the tools according to the invention are particularly economical. This is due to the fact that the cut is performed by successively arranged teeth, that the profile machined by the cutting teeth is not changed when they are reground, and that the cutting teeth can rapidly be replaced and adjusted.

An embodiment of a cutting tool according to the invention is shown by way of example on the drawing and will be described hereinafter.

FIG. 2 is a transverse sectional view taken on line II—II of FIG. 1, and

FIG. 3 is a side elevation showing the tool of FIG. 1, divided into two halves.

Figure 1:
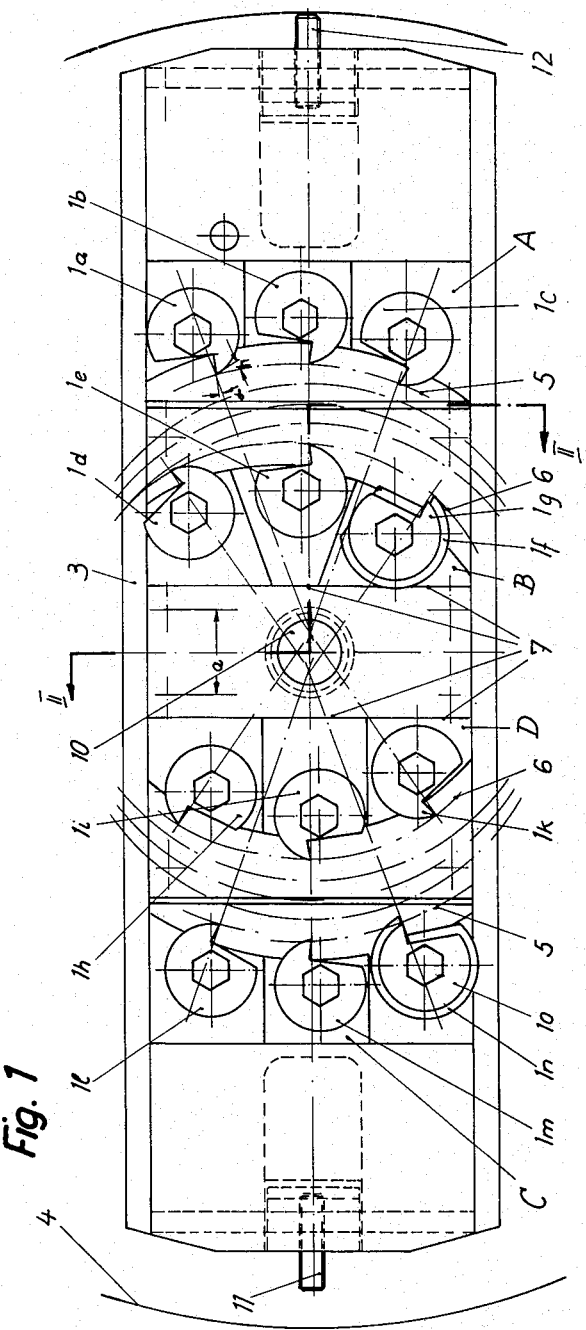
FIG. 1 is a top plan view showing such cutting tool.

As it is apparent from the drawing, part-circular cutting teeth $1a$ to $1o$ are provided, which serve to machine the outside and inside profiles of roots 2 of turbine blades. The cutting teeth $1a$ to $1o$ are mounted on a slide 3, which is carried by a rotary disc 4. The cutting teeth $1a$ to $1o$ are disposed on outer and inner arcs of a circle 5, 6 and in different axial positions selected in view of the desired shape of the root 2 on both sides thereof. The cutting teeth disposed on each inner arc of a circle face the cutting teeth disposed on the adjacent outer arc of a circle, and vice versa. It is apparent that as the rotary disc 4 is rotated the cutting teeth of one subset A machine the carrying outside profile portions of the root 2 and at the same time the cutting teeth of another subset B machine the non-carrying inside profile portions of the root 4. As indicated in conjunction with the root 2', the succeeding cutting teeth of a subset C machine the non-carrying outside profile portions of the root and the cutting teeth of a subset D machine the carrying inside profile portions of the root.

Depending on the desired profile, two or more part-circular cutting teeth $1f$, $1g$ and $1n$, $1o$ may be arranged one over the other. By means of jigs, the circular cutting teeth $1a$ to $1o$ can easily be reground to a constant cutting angle $\alpha$ whereas the relief $h$ is determined by the ratio of the diameter of the cutting tool to the diameter of the circle of cut, as is indicated for the cutting tooth $1a$ in FIG. 1.

The cutting teeth $1a$ to $1o$ can be most quickly fixed by means of a jig. The cutting teeth of each of the subsets A, B, C, and D can be adjusted jointly and individually. For a basic adjustment, the slide 3 is adjusted within a limited range on the rotary disc 4. For this purpose, a pin 10 is provided at the center of the slide 3. Adjusting screws 11, 12 are provided on opposite sides and serve for an adjustment in case of a tool replacement.

What is claimed is:

1. A tool for machining a profile on a workpiece while the same is held stationary, comprising:
   a. a rotary disc, and
   b. a plurality of partly circular cutting teeth readjustably mounted on said disc in at least two sets in different positions along the axis of said disc with the first of said sets disposed radially from said axis in an arc of a circle to cut an inside profile of said workpiece and the second of said sets also spaced radially from said axis and substantially concentrically from said first set to essentially simultaneously cut an outside profile of said workpiece with the teeth of said second set being positioned to face the set disposed on the same side of said axis of said disc.

2. A tool as set forth in claim 1, including a third and a fourth set of teeth with said third set and said fourth set arranged in relationship to each other in the manner of said first set and said second set with one member of said first set and said second set and one member of said third set and said fourth set used for machining carrying profile portion while the other member of said first set and said second set and said third set and said fourth set used for machining non-carrying profile portion.

3. A tool as set forth in claim 1, which is adapted to machine roots of turbine blades.

4. A tool as set forth in claim 1, in which
   a slide is axially adjustably mounted in said rotary disc and
   each of said cutting teeth is mounted in said slide for individual pivotal adjustment relative thereto.

* * * * *